United States Patent
Parihar et al.

(10) Patent No.: US 10,050,891 B1
(45) Date of Patent: Aug. 14, 2018

(54) SYSTEMS AND METHODS FOR DISTRIBUTING RELAY WIRELESS DEVICES ACROSS AN ACCESS NODE

(71) Applicant: Sprint Spectrum LP, Overland Park, KS (US)

(72) Inventors: Vanil Parihar, Overland Park, KS (US); Nitesh Manchanda, Overland Park, KS (US); Sreekar Marupaduga, Overland Park, KS (US); Sharath Somashekar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 67 days.

(21) Appl. No.: 15/235,620

(22) Filed: Aug. 12, 2016

(51) Int. Cl.
*H04J 3/07* (2006.01)
*H04L 12/851* (2013.01)
*H04W 16/26* (2009.01)
*H04W 16/32* (2009.01)
*H04W 40/12* (2009.01)

(52) U.S. Cl.
CPC ......... *H04L 47/2433* (2013.01); *H04W 16/26* (2013.01); *H04W 16/32* (2013.01); *H04W 40/12* (2013.01)

(58) Field of Classification Search
CPC .......... H04W 24/08; H04W 72/0413
USPC .......... 370/253–506; 455/405–411
See application file for complete search history.

(56) References Cited

U.S. PATENT DOCUMENTS

| | | | |
|---|---|---|---|
| 2013/0044654 A1 | 2/2013 | Chen et al. | |
| 2013/0301481 A1* | 11/2013 | Inoue | H04L 47/00 370/259 |
| 2013/0301605 A1* | 11/2013 | Kim | H04L 1/00 370/330 |
| 2014/0313895 A1* | 10/2014 | Huber | H04L 45/302 |

* cited by examiner

*Primary Examiner* — Iqbal Zaidi (57) ABSTRACT

Exemplary embodiments described herein include systems, methods, and nodes for distributing relay wireless devices across an access node. Network identification numbers associated with at least two wireless devices may be determined. At an access node, a traffic class identifier and frequency band may be assigned to the at least two wireless devices, wherein each frequency band available for communication at the access node is assigned at most a maximum number of wireless devices comprising a network identification number that meets the criteria. Data may then be communicated between the access node and the at least two wireless devices according to the assigned traffic class identifiers and frequency bands, wherein the wireless devices comprise relay wireless devices that relay data between the access node and one or more small cells.

16 Claims, 5 Drawing Sheets

SYSTEMS AND METHODS FOR DISTRIBUTING RELAY WIRELESS DEVICES ACROSS AN ACCESS NODE

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to designate a wireless device as a relay node or relay UE for relaying communication between a base station or access node (donor access node), and an end-user wireless device. Relay wireless devices may be used at the edge of a coverage area of an access node to improve coverage and/or service, as well as in crowded areas having a high number of other wireless devices to increase the available throughput to the end-user wireless devices being relayed. However, it may be beneficial to manage resource assignments for relay wireless devices at an access node (donor access node) such that the impact of the relay wireless devices on normal wireless devices serviced by the access node is mitigated.

OVERVIEW

Exemplary embodiments described herein include systems, methods, and nodes for distributing relay wireless devices across an access node. Network identification numbers associated with at least two wireless devices may be determined. At an access node, a traffic class identifier and frequency band may be assigned to the at least two wireless devices, wherein each frequency band available for communication at the access node is assigned at most a maximum number of wireless devices comprising a network identification number that meets the criteria. Data may then be communicated between the access node and the at least two wireless devices according to the assigned traffic class identifiers and frequency bands, wherein the wireless devices comprise relay wireless devices that relay data between the access node and one or more small cells.

DETAILED DESCRIPTION

In an embodiment, methods and system are described for distributing relay wireless devices across an access node. For example, a relay wireless device may connect a small cell to an access node such that the relay wireless device relays backhaul traffic to and from the access node and small cell. However, relay wireless devices may present a different set of challenges from a standard wireless device. For example, when a traffic load at the small cell increases suddenly, the backhaul traffic may similarly increase and the frequency band used to communicate between the relay wireless device and the access node may become congested. Accordingly, it may be beneficial to distribute relay wireless devices across frequency bands available for communication at an access node. In addition, reserving a traffic type for particular frequency bands used to communicate with relay wireless devices may further mitigate against the congestion risks that arise when multiple relay wireless devices are deployed over a coverage area of an access node.

Figure 1:
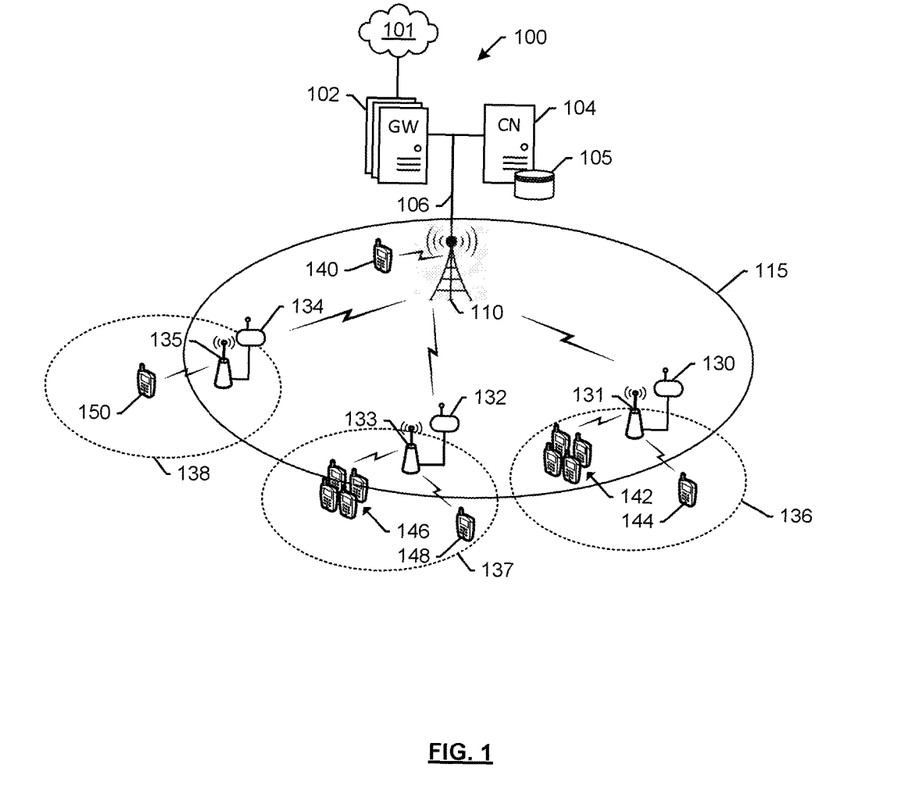
FIG. 1 depicts an exemplary system for distributing relay wireless devices across an access node.

FIG. 1 depicts an exemplary system 100 for distributing relay wireless devices across an access node. System 100 comprises a communication network 101, gateway nodes 102, controller node 104, access node 110, relay wireless devices 130, 132, and 134, and wireless devices 140, 142, 144, 146, 148, and 150, which may comprise end-user wireless devices. In this embodiment, access node 110 provides services to wireless devices 142, 144 via relay access node that comprises a combination of relay wireless device 130 and relay access point or small cell 131, to wireless devices 146 and 148 via relay access node that comprises a combination of relay wireless device 132 and relay access point or small cell 133, and to wireless device 150 via relay access node that comprises a combination of relay wireless device 134 and relay access point or small cell 135. Consequently, access node 110 may be referred to as a donor access node. Relay wireless device 130 is thus configured to relay services from access node 110 to wireless devices 142 and 144. Relay wireless devices 132 and 134 are similarly configured.

In an embodiment, to achieve this, relay wireless devices 130, 132, and 134 may comprise a customer premise equipment (CPE), which may be any stationary LTE wireless device having a stronger computational & RF capability versus standard wireless devices, as well as a directional antenna and a dedicated power supply. Relay wireless device 130 also may be communicatively coupled to small cell 131, which may be a relay access point, relay wireless device 132 may be communicatively coupled to small cell 133, which may be a relay access point, and relay wireless device 134 may be communicatively coupled to small cell 135, which may be a relay access point. Small cells 131, 133, and 135 may include a mini-macro, picocell, femtocell, or the like that are capable of providing a wireless access point for wireless devices 142, 144, 146, 148, and 150, of which wireless devices 142 and 146 comprise a cluster of wireless devices. Access node 110 is illustrated as having coverage area 115, small cell 131 is illustrated as having coverage area 136, small cell 133 is illustrated has having coverage area 136, and small cell 135 is illustrated has having coverage area 137. Relay wireless devices 130, 132, and 134 are located within coverage area 115. Wireless devices 140 and 142 are located within coverage area 115, wireless device 144 is located outside coverage area 115 but within coverage area 136 of small cell 131, and wireless devices 146 and 148 are located outside coverage area 115 but within coverage area 137 of small cell 133. As a consequence, cluster of wireless devices 142 may access network services using the combination of relay wireless device 130 and small cell 131, rather than overload access node 110, which may be serving numerous other devices, such as wireless device 140. Wireless devices 146 and 148 may similarly access network services using relay wireless device 132 and small cell 133. Moreover, wireless device 144 that is outside coverage area 115 may access network services from access node 110 by virtue of being connected to relay wireless device 130 via small cell 131.

In an embodiment, relay wireless devices 130, 132, and 134 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access node 110 are amplified and transmitted by relay wireless devices 130, 132, and 134 to one or more of wireless devices 142, 144, 146, 148, and 150. Likewise, RF signals received from wireless devices 142, 144, 146, 148, and 150 are amplified and transmitted by relay wireless device 130, 132, and 134, respectively, to access node 110. Alternatively or in addition, a layer 2 relay device performs a decode and forward (DF) function. RF signals received from access node 110 are demodulated and decoded, then encoded and modulated again before being transmitted by relay wireless devices 130, 132, and 134 to one or more of wireless devices 142, 144, 146, 148, and 150. Likewise, RF signals received from one or more of wireless devices 142, 144, 146, 148, and 150 are demodulated and decoded, then encoded and modulated again before being transmitted by relay wireless devices 130, 132, and 134 to access node 110. Alternatively or in addition, a layer 3 relay device also performs a decode and forward function. However, a layer 3 relay device also performs additional processing (such as ciphering and/or data concatenation/segmentation/resassembly). In other words, relay wireless devices 130, 132, and 134 may perform demodulation and decoding of the received RF signals (either uplink or downlink), processing of the received data, then encode, modulate, and transmit the data to one or more of wireless devices 142, 144, 146, 148, and 150.

Relay wireless devices 130, 132 and 134 and wireless devices 140, 142, 144, 146, 148, and 150 may be any device, system, combination of devices, or other such communication platform capable of communicating wirelessly with access node 110 using one or more frequency bands deployed by access node 110. Relay wireless devices 130, 132, 134, and wireless devices 140, 142, 144, 146, 148, and 150 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible. In some embodiments, relay wireless devices 130, 132, and 134 include stronger computational & radiofrequency capabilities than an average wireless device, as well as a directional antenna, and dedicated power supply, so that they can sustain an over-the-air backhaul link for wireless devices 142, 144, 146, 148, and 150 that attach to small cells 131, 133, and 135, respectively.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by relay wireless devices 130, 132, 134, and wireless device 140, 142, 144, 146, 148, and 150. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Communication link 106 may include S1 communications links. Other wireless protocols can also be used. Communication link 106 can be a direct link or might include various equipment, intermediate components, systems, and networks. Communication link 106 may comprise many different signals sharing the same link Gateway nodes 102 can be any network node or plurality of network nodes that are configured to interface with other network nodes using various protocols. Gateway nodes 102 can communicate user data over system 100. Gateway nodes 102 can be standalone computing devices, computing systems, or network components, and can be accessible, for example, by a wired or wireless connection, or through an indirect connection such as through a computer network or communication network. For example, gateway nodes 102 can include a serving gateway (S-GW) and/or a public data network gateway (P-GW), etc. Gateway nodes 102 can include a relay S-GW/P-DW combination for providing gateway services to relay wireless devices 130, 132, and 134, as well as a UE S-GW/P-DW combination for providing gateway services to one or more of wireless devices 140, 142, 144, 146, 148, and 150. In embodiments, data packets such as voice over IP (VoIP) data packets may be routed from one or more of wireless devices 142, 144, 146, 148, and 150 to a relay S-GW/P-GW first, and then to a UE S-GW/P-GW. However, persons having ordinary skill in the art would recognize that gateway nodes 102 are not limited to any specific technology architecture, such as Long Term Evolution (LTE), and can be used with any network architecture and/or protocol.

Each of gateway nodes 102 can comprise a processor and associated circuitry to execute or direct the execution of computer-readable instructions to obtain information. Gateway nodes 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway nodes 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Access node 110 can be any network node configured to provide communication between wireless devices relay wireless devices 130, 132, and 134, and wireless devices 140, 142, 144, 146, 148, and 150, and communication network 101. Access node 110 can be a macrocell access node such as a base transceiver station, a radio base station, an eNodeB device, or an enhanced eNodeB device, or the like. In an exemplary embodiment, a macrocell access node can have a coverage area 115 in the range of approximately five kilometers to thirty five kilometers and an output power in the tens of watts.

Small cells 131, 133, and 135 may comprise a small access node, microcell access node, a picocell access node, a femtocell access node, or the like such as a home NodeB or a home eNodeB device. A coverage area for a small cell may be smaller than the overage area for a macro cell (e.g., access node 110). Moreover, it is noted that while access node 110 and small cells 131, 133, and 135 are illustrated in FIG. 1, any number of access nodes and/or small cells can be implemented within system 100.

Access node 110 and small cells 131, 133, and 135 can comprise a processor and associated circuitry to execute or direct the execution of computer-readable instructions to obtain information. Access node 110 and small cells 131, 133, and 135 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 and small cells 131, 133, and 135 can receive instructions and other input at a user interface. Access node 110 communicates with gateway nodes 102 and controller node 104 via communication link 106. Operations performed by one or all of access node 110 and small cells 131, 133, and 135 are further described herein with reference to FIG. 4.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
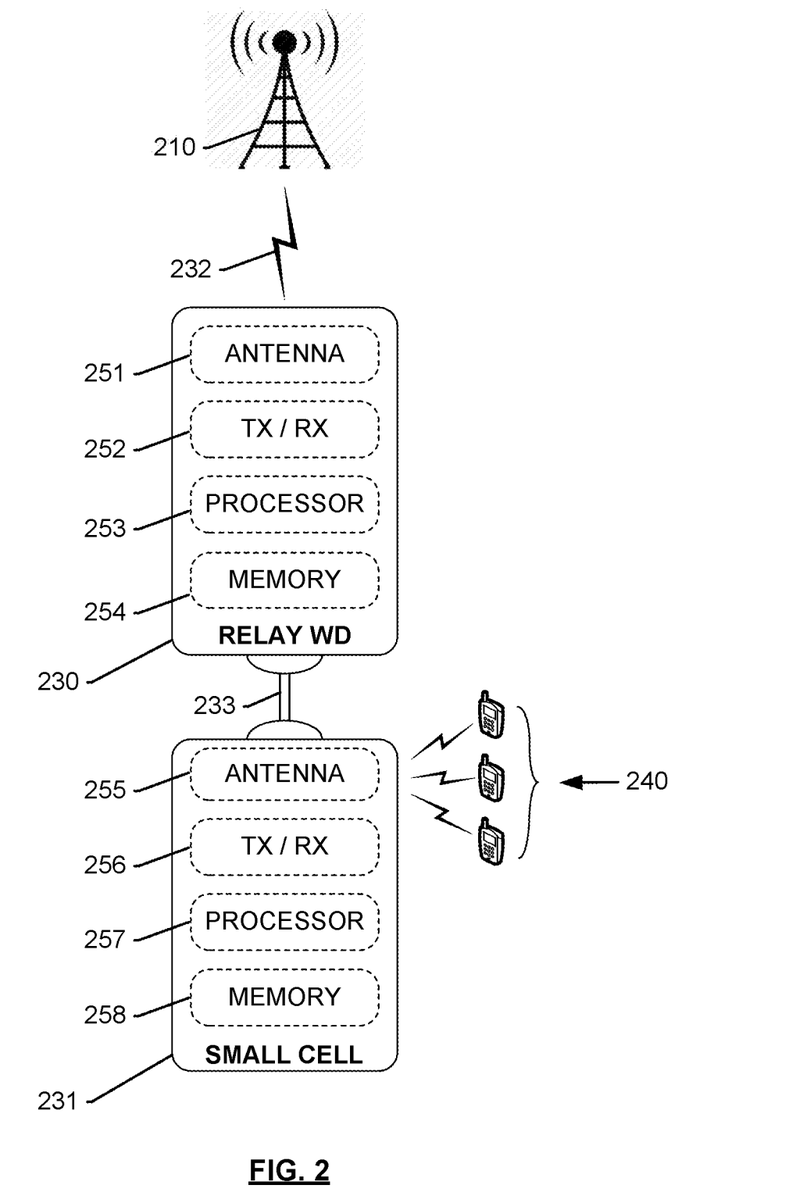
FIG. 2 depicts an exemplary relay wireless device coupled to a small cell.

FIG. 2 depicts an exemplary relay wireless device 230, or relay user equipment (UE), coupled to a small cell 231, or picocell. Relay wireless device 230 is illustrated as comprising an antenna 251 for direct (e.g., unrelayed) communication with access node 210 via communication link 232, a transceiver 252, a processor 253, and a memory 254 for storing instructions that enable relay wireless device 230 to perform operations described herein. In some embodiments, relay wireless device 230 is referred to as a customer premise equipment (CPE), which includes any stationary LTE wireless device having a stronger computational & RF capability versus standard wireless devices, as well as a directional antenna and a dedicated power supply, enabling relay wireless device 230 to efficiently provide resources to wireless devices 240 via small cell 231. Consequently, small cell 231 may be co-located with relay wireless device 230, and is connected to relay wireless device 230 via a communication interface 233. Communication interface 233 may be any interface that enables direct communication between relay wireless device 230 and small cell 231, such as USB, FireWire, Ethernet, or any other serial, parallel, analog, or digital interface. Small cell 231 is illustrated as comprising an antenna 255 for wireless communication with wireless devices 240, a transceiver 256, a processor 257, and a memory 258 for storing instructions that enable small cell 231 to perform operations described herein. In some embodiments, small cell 231 may be a Home eNodeB. Moreover, although only one transceiver is depicted in each of relay wireless device 230 and small cell 231, additional transceivers may be incorporated in order to facilitate communication across interface 233 and other network elements.

In operation, relay wireless device 230 relays network services from access node 210 to wireless devices 240 via small cell 231. Relay wireless device 230 may begin to function as a relay UE by sending a message to access node 210 to indicate to access node 210 that relay wireless device 230 is functioning as a relay. Access node 210 may consequently alter how relay wireless device 230 is assigned resources. In some embodiments, relay wireless device 230 can request to send a buffer status report to access node 210. Access node 210 can grant this request in a conventional manner. Relay wireless device 230 may respond to the grant by sending a short buffer status report. This short buffer status report is associated with a logical channel group that indicates the buffer status report is communicating the status of the UE as a relay, and thus is not asking for additional resource allocations (like a 'conventional' buffer status report would indicate). In other words, when a UE responds with a buffer status report for a predetermined logical channel group, it indicates that the UE is functioning as a relay rather than serving as a conventional buffer status report. Once status of relay wireless device 230 is established, relay wireless device 230 may instruct small cell 231 to start accepting connection requests from one or more of wireless devices 240.

Figure 3:
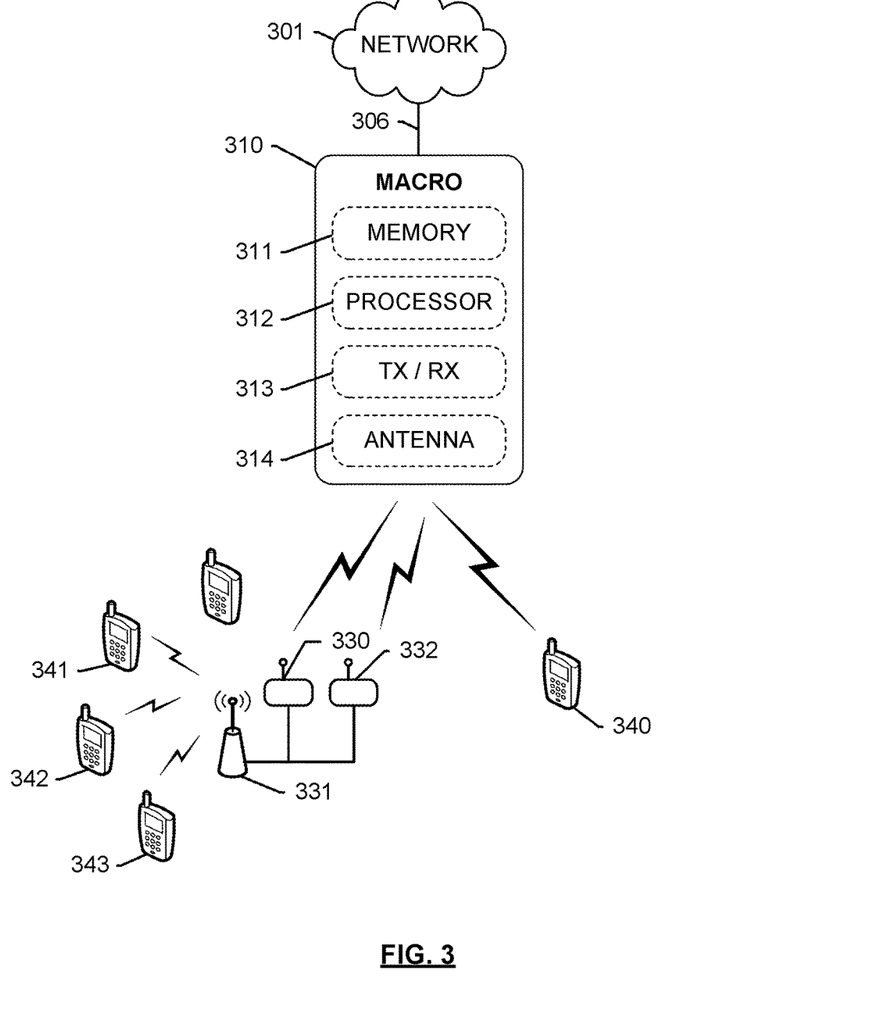
FIG. 3 depicts an exemplary access node.

FIG. 3 depicts an exemplary access node 310 which may comprise, for example, a macro access node. As described herein, access node 310 provides access to network services from network 301 to wireless devices 340, 341, 342, 343, either directly, or via relay wireless device 330 and small cell 331. In this embodiment, access node 310 is illustrated as being in communication with network 301 via communication link 306, and comprising a memory 311 for storing instructions that enable access node 310 to perform operations described herein. Further, access node 310 comprises a processor 312 for executing operations, and a transceiver 313 coupled to an antenna 314 for wireless communication with one or more wireless devices, such as wireless device 340, or relay wireless device 330. Further, communication link 306 may be any interface that enables communication between access node 310 and network 301, such as an S1 interface. In some embodiments, access node 310 may be in communication with multiple relay wireless devices connected to small cell 331, such as relay wireless devices 330 and 332. Here, access node 310 provides access to network services from network 301 to wireless devices 340, 341, 342, 343, via relay wireless devices 330 and 332, and small cell 331. Other network nodes such as gateways and controllers may be present but are not shown for purposes of simplicity.

Referring back to FIG. 1, in operation, system 100 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

As illustrated, a number of relay wireless devices may overlap with coverage area 115 of access node 110, such as relay wireless devices 130 and 132. Since the relay wireless devices serve as backhaul for one or more small cells (e.g., small cells 131 and 133), access node 110 may assign wireless resource in order to communicate with relay wireless devices 130 and 132. For instance, relay wireless devices may be assigned a traffic class, such as a quality of service class identifier (QCI), and one or more frequency bands for communication. However, because the relay wireless devices serve as backhaul for small cells, they may consume greater wireless resources than normal wireless device and/or the frequency bands assigned to them for communication may be subject to congestion. In some instances, the small cells served by the relay nodes may experience sudden changes in load, and thus the assigned frequency bands may similarly experience sudden changes in load. Accordingly, it may be beneficial to distribute resource assignments for relay wireless devices such that any negative affect on service to normal wireless devices served by a donor access node can be mitigated.

Figure 4:
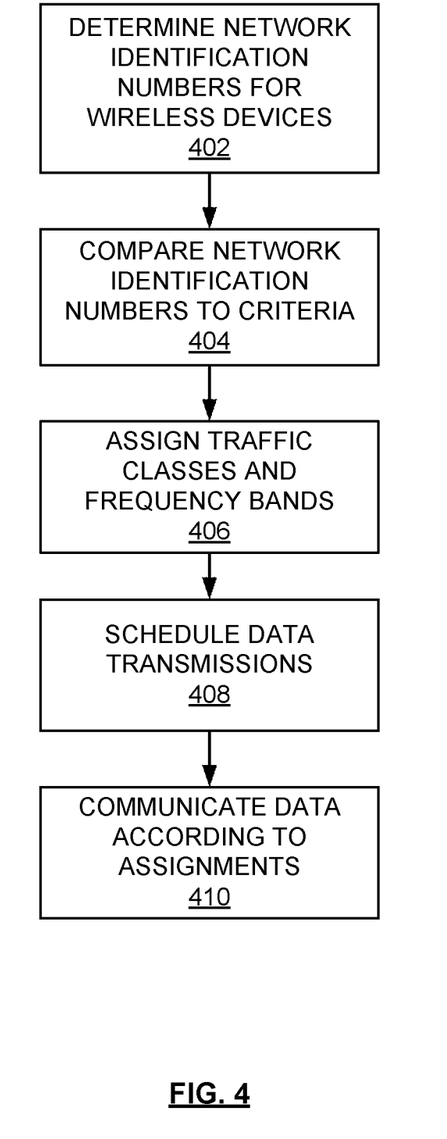
FIG. 4 depicts an exemplary method for distributing relay wireless devices across an access node.

FIG. 4 illustrates an exemplary method distributing relay wireless devices across an access node according to an embodiment. The method will be discussed with reference to the exemplary communication system 100 illustrated in FIG. 1, however, the method can be implemented with any suitable communication system.

Referring to FIG. 4, at step 402, network identification numbers associated relay wireless devices may be determined. For example, network identification numbers associated with relay wireless devices 130, 132, and 134 may be determined. In an embodiment, the network identification numbers may comprise public land mobile network identity (PLMN-ID) numbers. PLMN-ID numbers may be used to identify a network operator (e.g., service provider). Other network identification numbers may be implemented similarly.

At step 404, the determined network identification numbers may be compared to a criteria. For example, determined PLMN-ID numbers for relay wireless devices 130, 132, and 134 may be compared to a criteria. In an embodiment, a first predetermined PLMN-ID number (or set of numbers) may indicate normal wireless devices (e.g., non-relay wireless devices) while second predetermined PLMN-ID number (or set of numbers) may indicate relay wireless devices.

In an embodiment, the criteria may comprise the second predetermined number or set of numbers. Here, the determined PLMN-ID numbers may be compared to the criteria (i.e., the second predetermined number or set of numbers), and, when the determined PLMN-ID numbers meets the criteria, it may be determined that the wireless devices associated with the PLMN-ID numbers comprise relay wireless devices. Because the determined network identification numbers for relay wireless devices 130, 132, and 134 comprise the second predetermined PLMN-ID number (or fall within the second set of numbers) it will be determined that the determined PLMN-ID numbers meet the criteria.

At step 406, a traffic class identifier and frequency band may be assigned to the relay wireless devices, wherein each frequency band available for communication at the access node is assigned at most a maximum number of wireless devices comprising a network identification number that meets the criteria. For example, wireless devices in communication with access node 110 (both relay and non-relay) may be assigned wireless resources. In some embodiments, this may include assigning the wireless devices a traffic class identifier (e.g., QCI) and one or more frequency bands to be used for communication with access node 110.

A traffic class identifier may comprise a set of service requirements for a wireless device. For example, where the traffic class identifier comprises a QCI, the set of service requirements may include permitted packet delay budget, permitted packet error loss rate, guaranteed or non-guaranteed bit rate, priority, and the like. In addition, some QCIs may permit additional functionality whiles others do not. For example, a subset of QCIs may permit carrier aggregation while the remaining QCIs do not. In some embodiments, multiple frequency bands may be assigned to a wireless device when carrier aggregation is performed for the wireless device, as detailed herein.

In an embodiment, carrier aggregation may also be implemented by the system 100. For example, access node 110 may communicate with wireless devices over multiple frequency bands using carrier aggregation such that the data rate (or throughput) for the communication is greater than the data rate for single carrier communication. In an embodiment, access node 110 may communicate with a wireless device using a primary carrier (e.g., a first frequency band) and one or more secondary carriers (e.g., one or more secondary frequency bands). For example, a primary channel (e.g., 5 or 10 Mhz channel) and one or more secondary channels may be allocated for communication between access node 110 and a wireless device, where each channel may comprise a component carrier for the communication. When using carrier aggregation, the available spectrum for communication, and thus the data rate or throughput, may increase directly with the number of secondary component carriers. The communication may leverage one or more of intra-band carrier aggregation with contiguous component carriers, intra-band carrier aggregation with non-contiguous component carriers, or inter-band carrier aggregation.

In an embodiment, relay wireless devices 130, 132, and 134 may be assigned a QCI for communication with access node 110. Given that the determined PLMN-ID numbers for the wireless devices meet the criteria, the relay wireless devices may be assigned a QCI from among a subset of available QCIs. For example, due to a network hop associated with relay communications (e.g., additional network hop when relaying communications), relay wireless devices may benefit from latency requirements that are less beneficial to non-relay wireless devices. Accordingly, relay wireless devices 130, 132, and 134 may be assigned QCIs from among a subset of available QCIs that meet a latency criteria (e.g., that comprise service requirements less than a latency threshold).

In another embodiment, the QCI assignment may be based on the functionalities of the relay wireless devices. For example, relay wireless device 130 be able to implement carrier aggregation while relay wireless device 132 cannot. Accordingly, relay wireless device 130 may be assigned a QCI that allows for carrier aggregation and is also selected from among the subset of available QCIs that meet the latency requirement. On the other hand, relay wireless device 132 may be assigned a QCI that does not allow for carrier aggregation and is selected from among the subset of available QCIs that meet the latency requirement.

In an embodiment, the relay wireless devices may be assigned a QCI based on a load for the small cell connected to the relay wireless device. For example, relay wireless device 130 may be connected to small cell 131, and the QCI for relay wireless device 130 may be based on a load at small cell 131. A load for small cell 131 may include a number of wireless devices connected (e.g., RRC connections), a percentage utilization of available physical resource blocks, processing load, and any other suitable metric. In an embodiment, load on small cell 131 may also comprise the traffic class identifiers requirements (e.g., QCIs) for wireless devices connected to the small cell. For example, where load on small cell 131 meets a criteria (e.g., exceeds a threshold or exceeds the loads of other small cells overlapping coverage area 115 for access node 110), a QCI that allows for carrier aggregation may be assigned to relay wireless device 130 so that the backhaul communication between relay wireless device 130 and access node 110 allows for small cell 131 to meet load requirements (e.g., traffic class identifier requirements for connected wireless devices).

In an embodiment, frequency bands may also be assigned to the relay wireless devices. For example, frequency bands may be assigned to relay wireless devices 130, 132, and 134 such that each wireless device may communicate with access node 110 over the assigned frequency band. In some cases, a relay wireless device performing carrier aggregation may be assigned a plurality of frequency bands. Because the relay wireless devices serve as backhaul for small cells, they may consume greater wireless resources than normal wireless device and/or the frequency bands assigned to them for communication may be subject to congestion. In some instances, the small cells served by the relay nodes may experience sudden changes in load, and thus the assigned frequency bands may similarly experience sudden changes in congestion. Accordingly, to mitigate against congestion risk, in some embodiments, access node 110 may assign frequency bands to the relay wireless devices such that each frequency band is assigned a maximum number of relay wireless devices. Some examples of a maximum number can be 5, 3, or 1 relay wireless device assigned per frequency band.

In operation, at access node 110, relay wireless devices may be indicated by the PLMN-ID number associated with the wireless device. Accordingly, in an embodiment, each frequency band available for communication at access node 110 may be assigned at most a maximum number (e.g., 5, 3, or 1) of wireless devices comprising a network identification number that meets the criteria (e.g., meets the predetermined PLMN-ID number or set of numbers that indicates association with a relay wireless device).

In an embodiment, an assigned frequency band for a relay wireless device may be reserved for the traffic class indicator assigned to that relay wireless device. For example, relay wireless device 130 may be assigned a first QCI and a first frequency band and relay wireless device 132 may be assigned a second QCI and a second frequency band. The first QCI may be associated with carrier aggregation traffic. In this example, when communicating with a relay wireless device, access node 110 may reserve the first frequency band for carrier aggregation traffic. In some embodiments, if other relay wireless devices are assigned to the first frequency band, the traffic communicated to and from the other relay wireless devices may also comprise carrier aggregation traffic.

Similarly, when communicating with a relay wireless device, access node 110 may reserve the second frequency band for traffic associated with the second QCI. Examples of types of traffic include voice over LTE (VOLTE), carrier aggregation, beamforming, device to device (D2D), traffic with a latency requirement that meets a latency criteria (e.g., maximum permitted latency), and any other suitable traffic types. Here, when a relay wireless device is assigned a QCI and a frequency band, traffic to and from relay wireless devices over the assigned frequency band may be reserved for traffic of the type associated with the assigned QCI (e.g., one of the traffic types described herein, or the like).

In an embodiment, one or more of the frequency bands available for communication at access node 110 may comprise a flexible frequency band, where traffic to and from relay wireless devices over the flexible frequency band may not be reserved based on an assigned traffic class indicator. For example, relay wireless device 134 may be assigned a third QCI and a third frequency band. Here, the third frequency band may be a flexible frequency band, and thus traffic to and from relay wireless devices communicated over the third frequency band may comprise any traffic, not just traffic associated with the third QCI. Accordingly, in other examples, relay wireless device 134 may be assigned, the first, second, or third QCI in combination with the third frequency band, and data associated with any of the QCIs may be communicated between access node 110 and relay wireless device 134 over the third frequency band.

At step 410, data may be communicated between the access node and the relay wireless devices according to the assigned traffic class identifiers and frequency bands. For example, data may be communicated between access node 110 to relay wireless devices 130, 132, and 134, according to the assigned traffic class identifier and frequency band(s).

In an embodiment, where relay wireless device 130 is assigned a first QCI and a first frequency band, traffic of a type associated with the first QCI may be communicated between access node 110 and relay wireless device 130 over the first frequency band. Here, in some examples, traffic of a type that is not associated with the first QCI may not be communicated with relay wireless device 130 over the first frequency band. In some embodiments, backhaul traffic between small cell 131 and access node 110 that is not associated with the first QCI may be communicated by some communication channel other than relay wireless device 130. Similarly, where relay wireless device 132 is assigned a second QCI and a second frequency band, traffic of a type associated with the second QCI may be communicated between access node 110 and relay wireless device 132 over the second frequency band. Here, in some examples, traffic of a type that is not associated with the second QCI may not be communicated with relay wireless device 132 over the second frequency band. In some embodiments, backhaul traffic between small cell 133 and access node 110 that is not associated with the second QCI may be communicated by some communication channel other than relay wireless device 132.

In an embodiment, where relay wireless device 134 is assigned a third QCI and a third frequency band, traffic of a type associated with the first QCI, second QCI, third QCI, or any other traffic may be communicated between access node 110 and relay wireless device 134 over the third frequency band. Here, in some examples, the third frequency band may comprise a flexible frequency band, and traffic of any type may be communicated with relay wireless device 134 over the third frequency band. Thus, relay wireless device 134 may be assigned any of the first, second, or third QCIs in combination with the third frequency band.

In an embodiment (not illustrated in FIG. 1), two of relay wireless devices 130, 132, and 134 may connect to the same small cell such that the two wireless devices serve as backhaul connections to access node 110 for the small cell. In this example, the two relay wireless devices may communicate different traffic types with access node 110 over different frequency bands. For instance, where relay wireless device 130 and 132 connect to the same small cell, traffic associated with a first QCI may be communicated over the first frequency band via relay wireless device 130 and traffic associated with a second QCI may be communicated over the second frequency band via relay wireless device 132.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 310, relay wireless devices 130, 230, gateway nodes 102, and/or network 101.

Figure 5:
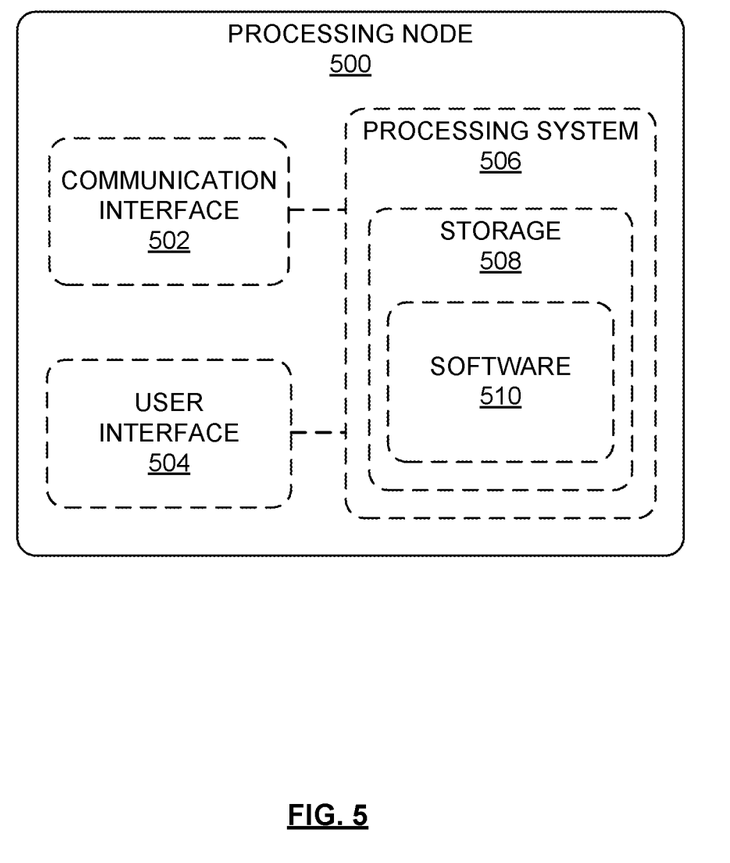
FIG. 5 depicts an exemplary processing node.

FIG. 5 depicts an exemplary processing node 500 comprising communication interface 502, user interface 504, and processing system 506 in communication with communication interface 502 and user interface 504. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. For example, software 510 may include modules for perform the operations described with reference to FIG. 4. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for distributing relay wireless devices across an access node, the method comprising:

determining network identification numbers associated with at least two wireless devices;

assigning, at an access node, traffic class identifiers and frequency bands to the at least two wireless devices, wherein each frequency band available for communication at the access node is assigned at a maximum number of wireless devices having associated network identification numbers that match a predetermined set of identification numbers; and communicating data between the access node and the at least two wireless devices according to the assigned traffic class identifiers and frequency bands, wherein the wireless devices comprise relay wireless devices that relay data between the access node and one or more small cells, wherein a first traffic class identifier is assigned to a first wireless device of the at least two wireless devices and a second traffic class identifier is assigned to a second wireless device of the at least two wireless devices such that the access node is configured to perform carrier aggregation for the first wireless device based on the first traffic class identifier and is configured to not perform carrier aggregation for the second wireless device based on the second traffic class identifier, and wherein the first wireless device is assigned the first traffic class identifier based on a capability of the first wireless device to perform carrier aggregation.

2. The method of claim 1, wherein the determined network identification numbers associated with the at least two wireless devices indicate that the wireless devices comprise relay wireless devices.

3. The method of claim 2, wherein a first wireless device of the at least two wireless devices comprises a relay wireless device for a small cell in communication with the relay wireless device, and the relay wireless device is assigned the first traffic class identifier based on application requirements for wireless devices served by the small cell.

4. The method of claim 1, wherein traffic of a first type is transmitted from the access node to the first wireless device according to the first traffic class identifier based on a first frequency band, and traffic of a second type is transmitted from the access node to the second wireless device according to the second traffic class identifier based on a second frequency band.

5. The method of claim 4, wherein traffic of the first type is not transmitted over the second frequency band to the second wireless device and traffic of the second type is not transmitted over the first frequency band to the first wireless device.

6. The method of claim 5, wherein traffic of the first type comprises carrier aggregation traffic and traffic of the second type comprises traffic with a latency requirement that meets a latency criteria.

7. The method of claim 4, further comprising determining a network identification number associated with a third wireless device; and
assigning the first traffic class identifier and a third frequency band to the third wireless device when the determined network identification number for the third wireless device matches a predetermined identification number.

8. The method of claim 7, wherein traffic of the first type and the second type is transmitted from the access node to the third wireless device according to the first traffic class identifier based on the third frequency band.

9. The method of claim 8, wherein at least two of the first, second, and third wireless devices serve as a relay node for a same small cell.

10. The method of claim 1, wherein the maximum number of wireless devices comprises one wireless device.

11. A system for distributing relay wireless devices across an access node, the system comprising:
an access node with a processor configured to:

determine network identification numbers associated with at least two wireless devices;
assign traffic class identifiers and frequency bands to the at least two wireless devices, wherein each frequency band available for communication at the access node is assigned at a maximum number of wireless devices having associated network identification numbers that match a predetermined set of identification numbers; and
communicate data between the access node and the at least two wireless devices according to the assigned traffic class identifiers and frequency bands, wherein the wireless devices comprise relay wireless devices that relay data between the access node and one or more small cells,
wherein a first traffic class identifier is assigned to a first wireless device of the at least two wireless devices and a second traffic class identifier is assigned to a second wireless device of the at least two wireless devices such that the access node is configured to perform carrier aggregation for the first wireless device based on the first traffic class identifier and is configured to not perform carrier aggregation for the second wireless devices based on the second traffic class identifier, and
wherein the first wireless device is assigned the first traffic class identifier based on a capability of the first wireless device to perform carrier aggregation.

12. The system of claim 11, wherein the determined network identification numbers associated with the at least two wireless devices indicate that the wireless devices comprise relay wireless devices.

13. The system of claim 12, wherein a first wireless device of the at least two wireless devices comprises a relay wireless device for a small cell in communication with the relay wireless device, and the relay wireless device is assigned the first traffic class identifier based on application requirements for wireless devices served by the small cell.

14. The system of claim 11, wherein traffic of a first type is transmitted from the access node to the first wireless device according to the first traffic class identifier based on a first frequency band, and traffic of a second type is transmitted from the access node to the second wireless device according to the second traffic class identifier based on a second frequency band.

15. The system of claim 14, wherein traffic of the first type is not transmitted over the second frequency band to the second wireless device and traffic of the second type is not transmitted over the first frequency band to the first wireless device.

16. The system of claim 15, wherein traffic of the first type comprises carrier aggregation traffic and traffic of the second type comprises traffic with a latency requirement that meets a latency criteria.

* * * * *